United States Patent
Theer

[15] 3,706,427
[45] Dec. 19, 1972

[54] CINEMATOGRAPHIC APPARATUS

[72] Inventor: Anton Theer, Munich, Germany

[73] Assignee: Agfa Gevaert A.G., Munich, Germany

[22] Filed: Aug. 23, 1971

[21] Appl. No.: 173,771

[30] Foreign Application Priority Data

Aug. 27, 1970 Germany..................P 70 31 984.5

[52] U.S. Cl...............................242/205, 352/191
[51] Int. Cl. ........................B11b 15/32, G03b 1/04
[58] Field of Search ......242/205–210; 352/187–196

[56] References Cited

UNITED STATES PATENTS 3,061,160  10/1962  Elsas......................................226/58
3,570,783  3/1972  Winkler................................242/205

Primary Examiner—Leonard D. Christian
Attorney—Michael S. Striker

[57] ABSTRACT

The takeup reel of a cimenatographic apparatus is rotated by the claw pull-down which pivots one arm of a two-armed lever by way of a torsion spring. The other arm of the lever carries two pivotable spring-biased pawls which cooperate with a toothed wheel on the takeup reel in such a way that one of the pawls rotates the wheel in a direction to enable the takeup reel to collect the film when the pull-down pivots the lever in a clockwise direction and that the other pawl rotates the wheel in the same direction as the one pawl when the pull-down pivots the lever in a counter-clockwise direction.

15 Claims, 1 Drawing Figure

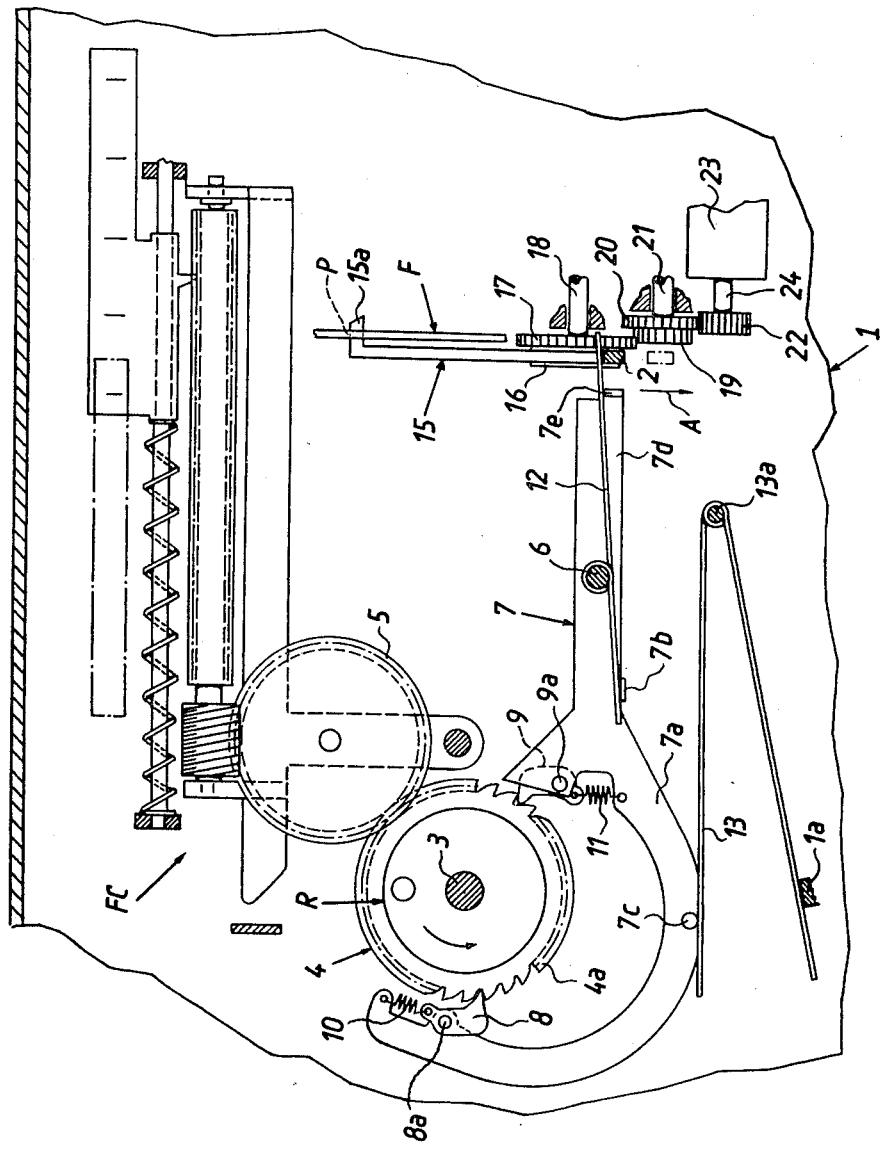

3,706,427

CINEMATOGRAPHIC APPARATUS

CROSS-REFERENCE TO RELATED INVENTION

The cinematographic apparatus of this invention constitutes an improvement over and a further development of the apparatus which is disclosed in U.S. Pat. No. 3,570,783, granted Mar. 16, 1971 to Friedrich Winkler et al and owned by the assignee of the present application.

BACKGROUND OF THE INVENTION

The present invention relates to cinematographic apparatus in general, and more particularly to improvements in the mechanisms which are used in motion picture cameras or motion picture projectors to drive a film collecting member, such as a takeup spool or reel. Still more particularly, the invention relates to improvements in drive mechanisms which employ ratchet and pawl means to intermittently rotate the takeup or film collecting member in a motion picture camera or projector.

The aforementioned U.S. Pat. No. 3,570,783 to Winkler et al discloses a cinematographic apparatus wherein the takeup reel can be rotated by a first ratchet wheel or gear which meshes with a second gear. A lever which is pivotable in the body of the cinematographic apparatus is oscillated by the claw pull-down or feeder of the film transporting device and carries two pawls each of which cooperates with one of the gears in such a way that the first gear is rotated in a single direction irrespective of whether it receives motion directly from one of the pawls or whether the other pawl rotates the second gear. An advantage of the just described cinematographic apparatus is that the mechanism which rotates the takeup reel is simple, rugged and has a minimal number of parts. Also, the customary friction clutch which is an essential component of nearly all presently known motion picture projectors or cameras can be replaced with a simple spring which is interposed between the claw pull-down and the lever to allow the pull-down to continue its recurrent movements even if the takeup reel is held against rotation. Furthermore, the takeup reel can be rotated to the desired extent even though the driving connection between the motor of the cinematographic apparatus and the takeup reel need not embody a worm drive or a like costly transmission.

SUMMARY OF THE INVENTION

An object of the invention is to provide a cinematographic apparatus with a novel and improved mechanism which serves to rotate the film collecting member and is simpler, more compact and at least as reliable and versatile as presently known mechanisms including that which is disclosed in the aforediscussed U.S. Pat. No. 3,570,783.

Another object of the invention is to provide a drive mechanism which can be used with advantage to rotate the film collecting member of a cinematographic apparatus and comprises a minimal number of precision-finished parts but is still capable of insuring automatic winding of exposed or projected film frames at the rate which is determined by the rate of film transport by the customary claw pull-down or an analogous film feeding device.

The invention is embodied in a cinematographic apparatus which comprises a rotary spool, reel or an analogous film collecting member, a toothed wheel or gear which is arranged to transmit torque to the film collecting member (such gear may constitute a ratchet wheel which is rigidly secured to a takeup reel), a film transporting mechanism including a driving member which is arranged to perform first recurrent movements (such driving member may form an integral or detachable part of a claw pull-down and may be designed and mounted to perform recurrent oscillating, reciprocatory or other movements), and novel motion transmitting means for rotating the gear in a single direction in response to recurrent movements of the driving member.

The motion transmitting means comprises a slide, a lever or an analogous carrier which normally receives motion from the driving member (either directly or by way of a torsion spring or analogous biasing means) and is constructed and mounted to thereby perform second recurrent movements including alternating movements in first and second directions, and a pair of pawls which are preferably pivotably mounted on the carrier and are preferably biased against the teeth of the gear by helical springs or other suitable resilient means. One of the pawls serves to rotate the gear in the single direction in response to each movement of the carrier in the first direction, and the other pawl serves to rotate the gear in the single direction in response to each movement of the carrier in the second direction.

The novel features which are considered as characteristic of the invention are set forth in particular in the appended claims.

The improved cinematographic apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE is a fragmentary diagrammatic partly sectional view of a motion picture camera which embodies the invention.

DESCRIPTION OF THE PREFERRED EMBODIMENTS

The drawing illustrates a portion of a motion picture camera for use with 8-millimeter film. The camera comprises a housing or body 1 wherein a strip of film F is transported from a supply reel (not shown) or an analogous source of unexposed film to a film collecting member here shown as a takeup reel R. The film transporting mechanism comprises a feeder in the form of a claw pull-down 15 having a claw 15a which can enter the perforations P of the film F and advances the film forwardly by the length of a frame while the shutter (not shown) seals the light-admitting aperture. The pull-down 15 performs recurrent movements under the action of an eccentric 16 which is rigid with a gear 17 mounted on a shaft 18. The gear 17 meshes with a gear 19 which is coaxial with a gear 20. the gears 19, 20 are mounted on a shaft 21 and the gear 20 meshes with a gear 22 on the output shaft 24 of an electric motor 23.

When the motor 23 is on, the gear train 22, 20, 19, 17 causes the eccentric 16 to impart to the claw pull-down 15 the aforementioned recurrent movements whereby the claw 15a transports the film F stepwise, always by the length of a frame.

The pull-down 15 is rigidly or separably connected with or made integral with a driving member or projection 2 which moves in and counter to the direction indicated by the arrow A when the motor 23 is on to operate the pull-down 15. The driving member 2 performs recurrent reciprocatory or oscillatory movements which are transmitted to the takeup reel R by way of a motion transmitting mechanism which is constructed and assembled in accordance with the present invention. The motion transmitting mechanism comprises basically a carrier in the form of a two-armed lever 7 and two pawls 8, 9 which are pivotably mounted on pins 8a, 9a provided on the arm 7a of the carrier or lever 7. The latter is pivotable back and forth about the axis of a shaft 6 which is fixedly mounted in the housing 1 of the motion picture camera. The shaft for the takeup reel R is shown at 3. This shaft defines an axis of rotation for a toothed member here shown as a ratchet wheel or gear 4 having an annulus of teeth 4a which can be engaged by the pallets of the pawls 8, 9 in response to recurrent back-and-forth pivotal movements of the lever 7 about the axis of the shaft 6. The wheel or gear 4 is directly or indirectly connected with the takeup reel R so that it can transmit torque thereto in order to rotate the reel R in a direction to collect the film F.

The motion transmitting mechanism between the wheel or gear 4 for the takeup reel R and the driving member 2 of the film transporting mechanism further comprises a first biasing means here shown as a torsion spring 12 one leg of which bears against the driving member 2 and the other leg of which bears against a stop 7b on the arm 7a of the lever 7. The median portion of the torsion spring 12 is convoluted around the shaft 6 and this spring is mounted in prestressed condition so that its legs normally bear against the aforementioned stop 7b on the arm 7a and against a second stop 7e on the arm 7d of the lever 7. A second biasing means 13, also shown in the form of a torsion spring, is convoluted around a fixed shaft 13a and has two legs one of which bears against a stationary stop 1a in the housing 1 and the other of which bears against a pin-shaped stop 7c on the arm 7a of the lever 7. The spring 13 tends to pivot the lever 7 in a clockwise direction, as viewed in the drawing. The arm 7a of the lever 7 further carries two resilient elements in the form of helical springs 10, 11 which respectively bias the pallets of the pawls 8 and 9 against the adjacent teeth 4a of the wheel 4.

The wheel 4 can drive a footage counter FC whose construction is preferably identical with or analogous to that of the footage counter which is disclosed in U.S. Pat No. 3,578,856 granted May 18, 1971 to Kurt Thate et al and owned by the assignee of the present application. The footage counter FC has a gear or wheel 5 which is in mesh with and receives torque from the wheel 4.

The arm 7a of the lever 7 includes a substantially U-shaped or semicircular portion which carries the stop 7c and the pawls 8, 9. It will be noted that the point (stop 7c) where the spring 13 bears against the arm 7a is remote from the points (stops 7b, 7e) where the lever 7 is engaged by the spring 12. The pawls 8, 9 are disposed substantially diametrically opposite each other with reference to the axis of the shaft 3, i.e., with reference to the axis of rotation of the wheel 4.

THE OPERATION

When the motor 23 is on so that the gear train 22, 20, 19, 17 rotates the eccentric 16, the latter causes the claw pull-down 15 to perform recurrent movements and to thereby move the driving member 2 in and counter to the direction indicated by the arrow A. When the driving member 2 moves in the direction which is indicated by the arrow A, the spring 13 pivots the lever 7 in a clockwise direction about the axis of the shaft 6 so that the spring 12 continues to remain in engagement with the driving member 2. Such clockwise pivotal movement of the lever 7 causes the pawl 9 to engage the adjacent tooth 4a and to rotate the wheel 4 and the takeup reel R in a counterclockwise direction, as viewed in the drawing. At the same time, the pallet of the pawl 8 rides or ratchets over the adjacent teeth 4a. When the driving member 2 thereupon moves counter to the direction indicated by the arrow A, it entrains the adjacent leg of the spring 12 and causes the lever 7 to pivot in a counterclockwise direction against the opposition of the spring 13. The pallet of the pawl 9 rides over the adjacent teeth 4a but the pallet of the pawl 8 engages one of the teeth 4a and rotates the wheel 4 and hence the takeup reel R in a counterclockwise direction, i.e., in the same direction in which the wheel 4 was rotated by the pawl 9 while the driving member 2 was moving in the direction indicated by the arrow A. The springs 10, 11 preferably insure that the pallets of the pawls 8, 9 remain in engagement with the teeth 4a at all times; however, the spring 10 allows the pallet of the pawl 8 to ride over the teeth 4a when the lever 7 is caused to pivot in a clockwise direction and the spring 11 allows the pallet of the pawl 9 to ride over the teeth 4a when the lever 7 is caused to pivot in a counterclockwise direction. The spring 13 exhibits the tendency to move the arm 7a of the lever 7 against the wheel 4.

If the wheel 4 cannot rotate any further (for example, because the entire film F is already convoluted on the reel R) but the motor 23 continues to operate the claw pull-down 15, the spring 13 is unable to pivot the lever 7 clockwise while the driving member 2 moves in the direction indicated by the arrow A. Thus, the inability of the wheel 4 to rotate counterclockwise does not affect the operation of the driving member 2 and pull-down 15. The driving member 2 then simply moves away from and back into abutment with the adjacent leg of the spring 12. If the wheel 4 is arrested while the driving member 2 moves counter to the direction indicated by the arrow A, the driving member simply stresses the spring 12 by moving the adjacent leg of this spring away from the stop 7e. The lever 7 remains at a standstill.

An important advantage of the improved motion transmitting mechanism between the driving member 2 and the wheel 4 for the takeup reel R is that the pawls 8, 9 cooperate with a single toothed member 4. This is in contrast to the construction of the mechanism which is shown in the aforementioned U.S. Pat. No. 3,570,783 and wherein each of the two pawls cooperates with a discrete toothed member. It is clear that the invention can be incorporated with equal advantage in other types of motion picture cameras and/or in motion picture projectors.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

I claim:

1. In a cinematographic apparatus, a combination comprising a rotary film collecting member; a toothed wheel arranged to transmit torque to said film collecting member; a film transporting mechanism including a driving member arranged to perform first recurrent movements; and motion transmitting means for rotating said wheel in a single direction in response to recurrent movements of said driving member, said motion transmitting means comprising a carrier normally receiving motion from said driving member and arranged to thereby perform second recurrent movements including alternating movements in first and second directions, and a pair of pawls mounted on said carrier, one of said pawls being arranged to rotate said wheel in said single direction in response to each movement of said carrier in said first direction and the other of said pawls being arranged to rotate said wheel in said single direction in response to each movement of said carrier in said second direction.

2. A combination as defined in claim 1, wherein said carrier is a lever which is pivotable by said driving member back and forth about a predetermined axis to thereby perform said alternating first and second movement.

3. A combination as defined in claim 1, wherein each of said pawl is pivotably mounted on said carrier and further comprising resilient means for biasing said pawls against the teeth of said wheel and for permitting said other pawl to ride over such teeth when said wheel is rotated by said one pawl, and vice versa.

4. A combination as defined in claim 1, wherein said film transporting mechanism comprises a claw pull-down and said driving member receives motion from said claw pull-down.

5. A combination as defined in claim 4, wherein said driving member is rigid with said claw pull-down.

6. A combination as defined in claim 1, wherein said wheel is rigid with said film collecting member.

7. A combination as defined in claim 1, wherein said pawls are disposed substantially diametrically opposite each other with reference to the axis of said wheel.

8. A combination as defined in claim 7, wherein said carrier is a lever which is pivotable about a predetermined axis and comprises a first arm and a second arm, said first arm receiving motion from said driving member and said pawls being mounted on said second arm.

9. A combination as defined in claim 8, wherein the second arm of said lever is substantially U-shaped.

10. A combination as defined in claim 1, wherein said motion transmitting means further comprises biasing means interposed between said driving member and said carrier to normally move said carrier in response to movement of said driving member.

11. A combination as defined in claim 10, wherein said carrier is a lever which is pivotable in said first and second directions about a predetermined axis, said lever having a first arm which receives motion from said driving member by way of said biasing means and a second arm which supports said pawls.

12. A combination as defined in claim 11, wherein said second arm of said lever is substantially U-shaped and said pawls are mounted on said second arm substantially diametrically opposite each other with reference to the axis of said wheel.

13. A combination as defined in claim 12, further comprising second biasing means permanently tending to pivot said lever in one of said first and second directions.

14. A combination as defined in claim 1, wherein said carrier is a lever having an arm which supports said pawls, said motion transmitting means further comprising first biasing means engaging said arm and arranged to bias said lever in one of said first and second directions and second biasing means arranged to transmit motion from said driving member to a portion of said lever which is remote from the point of engagement between said arm and said first biasing means.

15. A combination as defined in claim 14, wherein at least one of said biasing means is a torsion spring.

* * * * *